United States Patent [19]
Kazmierski, Jr. et al.

[11] 3,730,566

[45] May 1, 1973

[54] DUCT CONNECTOR

[75] Inventors: John Kazmierski, Jr., Ringoes; Benjamin Lawson, Jr., Somerset; Craig Edward Thornton, Flemington; Gerard Louis Verrelli, Jr., Manville, all of N.J.

[73] Assignee: Johns-Manville Corporation, New York, N.Y.

[22] Filed: May 3, 1971

[21] Appl. No.: 139,325

[52] U.S. Cl. ................................ 285/229, 285/331
[51] Int. Cl. ............................................. F16l 27/02
[58] Field of Search ................. 285/229, 226, 224, 285/300, 301, 299, 302, 331, 223, 227, 228

[56] References Cited

UNITED STATES PATENTS

| 289,265 | 11/1883 | Hurly | 285/299 X |
|---|---|---|---|
| 3,099,467 | 7/1963 | Godshalk | 285/229 X |
| 3,066,960 | 12/1962 | Adams | 285/226 |
| 1,263,953 | 4/1918 | Smyth | 285/229 |
| 2,712,456 | 7/1955 | McCreery | 285/226 X |
| 3,254,910 | 6/1966 | Poole et al. | 285/226 |
| 2,547,746 | 4/1951 | Cook | 285/227 X |

FOREIGN PATENTS OR APPLICATIONS

| 658,505 | 10/1951 | Great Britain | 285/226 |
|---|---|---|---|
| 896,985 | 5/1962 | Great Britain | 285/299 |

*Primary Examiner*—Thomas F. Callaghan
*Attorney*—John A. Kinney, Robert M. Krone, Joseph J. Kelly and Ronald M. Halvorsen

[57] ABSTRACT

A duct connector for connecting and accommodating relating movement (expansion, contraction and misalignment between openings of ducts carrying solid-laden corrosive hot gases. The passage through the expansion joint is lined with plates capable of relative sliding and tilting movement in three dimensions in a manner to maintain a shield against the gases passing therethrough.

6 Claims, 19 Drawing Figures

INVENTORS
JOHN KAZMIERSKI, JR.
BENJAMIN LAWSON, JR.
CRAIG EDWARD THORNTON
GERARD LOUIS VERRELLI, JR.

BY *Joseph J. Kelly*

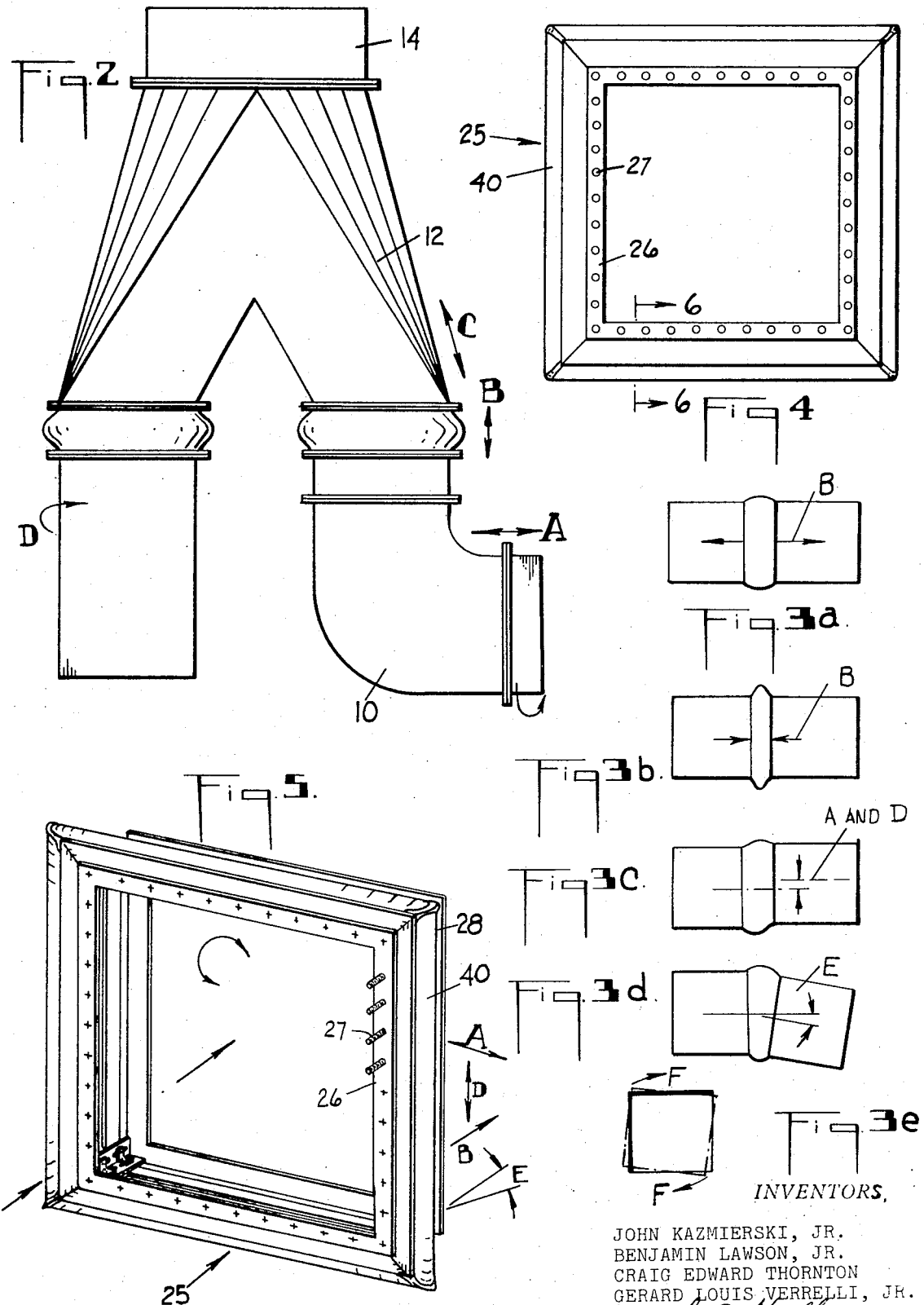

INVENTORS,
JOHN KAZMIERSKI, JR.
BENJAMIN LAWSON, JR.
CRAIG EDWARD THORNTON
GERARD LOUIS VERRELLI
BY Joseph J. Kelly JR.

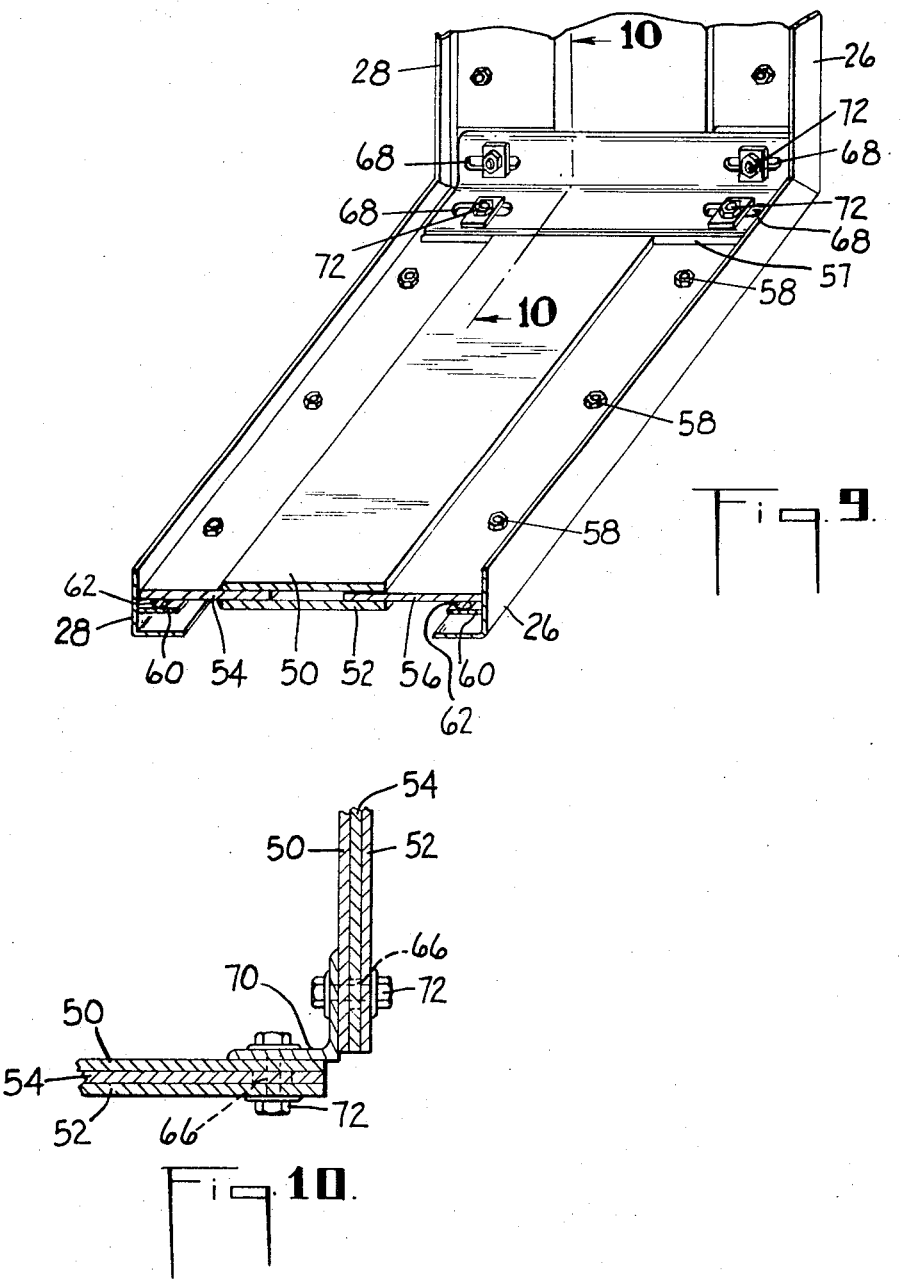

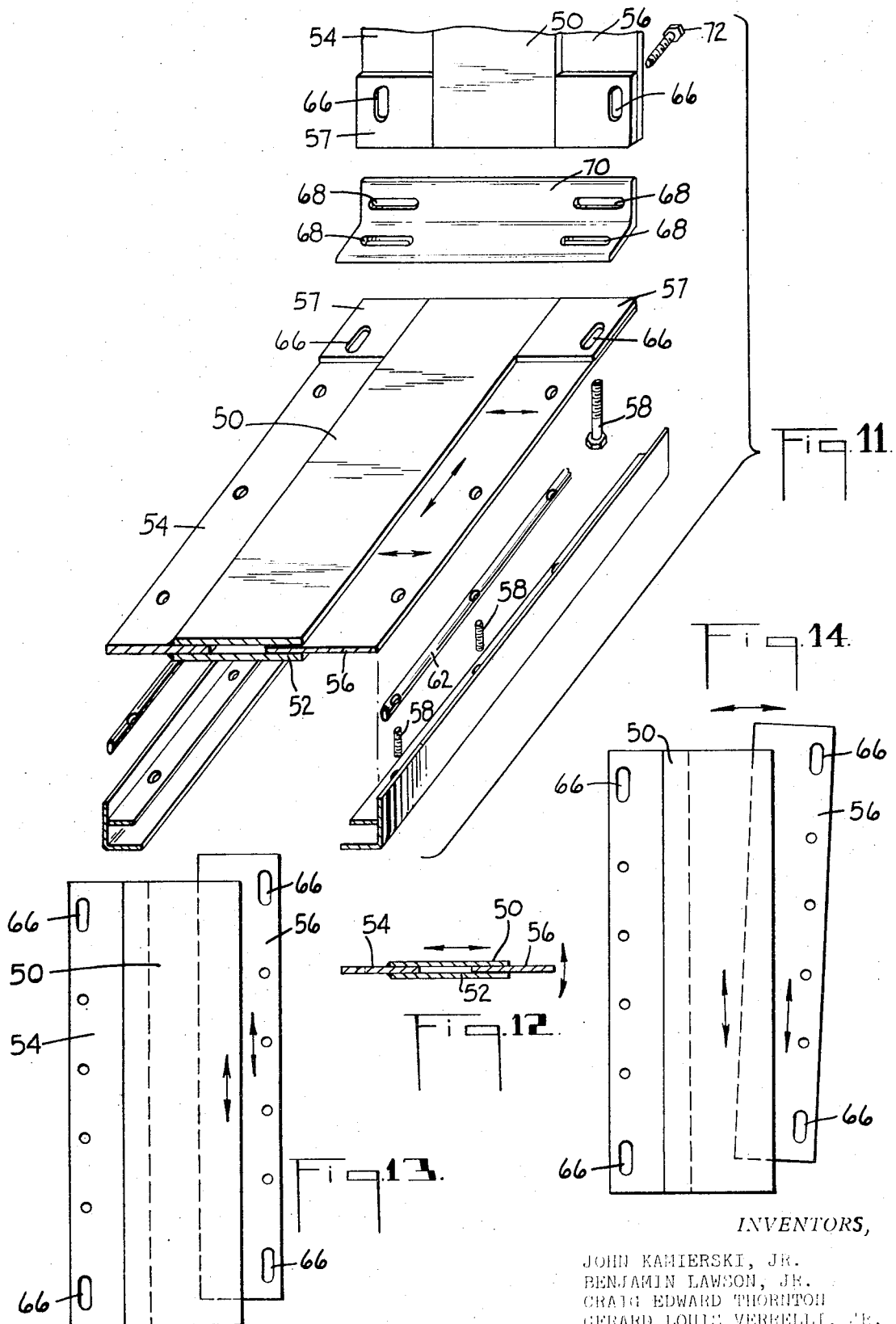

DUCT CONNECTOR

BACKGROUND OF THE INVENTION

Many problems are associated with providing a connector between large size ducts of power plants and the like for carrying solid-laden hot corrosive gases from combustion chambers to the stacks. Angular, lateral and torsional misalignment often exists between adjacent duct openings. This condition is compounded by expansion and contraction of the ducts caused by heated gases flowing therethrough. A common type duct connection for use under such conditions normally comprises a pair of open rectangular or circular frames connected by a flexible sleeve member through which the gases flow. Service conditions are difficult. The hot gases are corrosive. Fly ash, which is abrasive, is also corrosive in the presence of water. It is common to use flexible cloth impregnated with a rubber-like material or corrugated metal sleeves between the frames to accommodate displacement for their relative movement. These flexible or expansible sleeves must be protected from the corrosive gases.

The invention relates to a connector for joining of generally aligned duct openings which carry solid-laden hot corrosive gases and for accommodating relative movement between the openings, such as expansion, contraction and relative axial or torsional displacement. Also initial misalignment between ducts may exist. A protective shield lines the opening or longitudinal passage through the connector for protecting the sleeve from the action of the heat and fly ash. The shield permits relative sliding or tilting of the plates thereof in a three dimensional manner to maintain sealing with end frames even though movement between the adjacent ducts is considerable.

BRIEF SUMMARY OF THE INVENTION

It is an object of this invention to disclose a connector for connecting and accommodating duct openings for carrying solid-laden hot corrosive gases therethrough.

It is an object of this invention to disclose a sleeve for use inside a connector for protecting other parts thereof against fly ash and hot corrosive gases.

It is a further object to disclose a shield capable of movement in three directions to accommodate relative movement or misalignment between duct openings.

BRIEF DESCRIPTION OF THE DRAWINGS

The invention will be more fully understood and further objects and advantages thereof will become apparent when reference is made to the following detailed description of the preferred embodiment of the invention and the accompanying drawings in which:

FIG. 2 represents an arrangement of ducts wherein is illustrated various directions of movement imposed upon a connector;

FIGS. 3A through 3E represent various conditions of relative misalignment or movement between adjacent ducts;

FIG. 4 is a frontal view of the expansion joint;

FIG. 5 is a perspective view of the expansion joint;

FIG. 9 is a perspective view of a fragmentary portion of the shield;

FIG. 10 is a cross-sectional view taken along line 10—10 of FIG. 9;

FIG. 11 is an exploded view showing elements of FIG. 9;

FIG. 12 illustrates relative movements of the shield;

FIG. 13 illustrates plates of the shield in relative longitudinal displacement; and FIG. 14 illustrates plates of the shield in relative longitudinal and angular displacement.

DESCRIPTION OF THE PREFERRED EMBODIMENT

Figures 1, 1A:
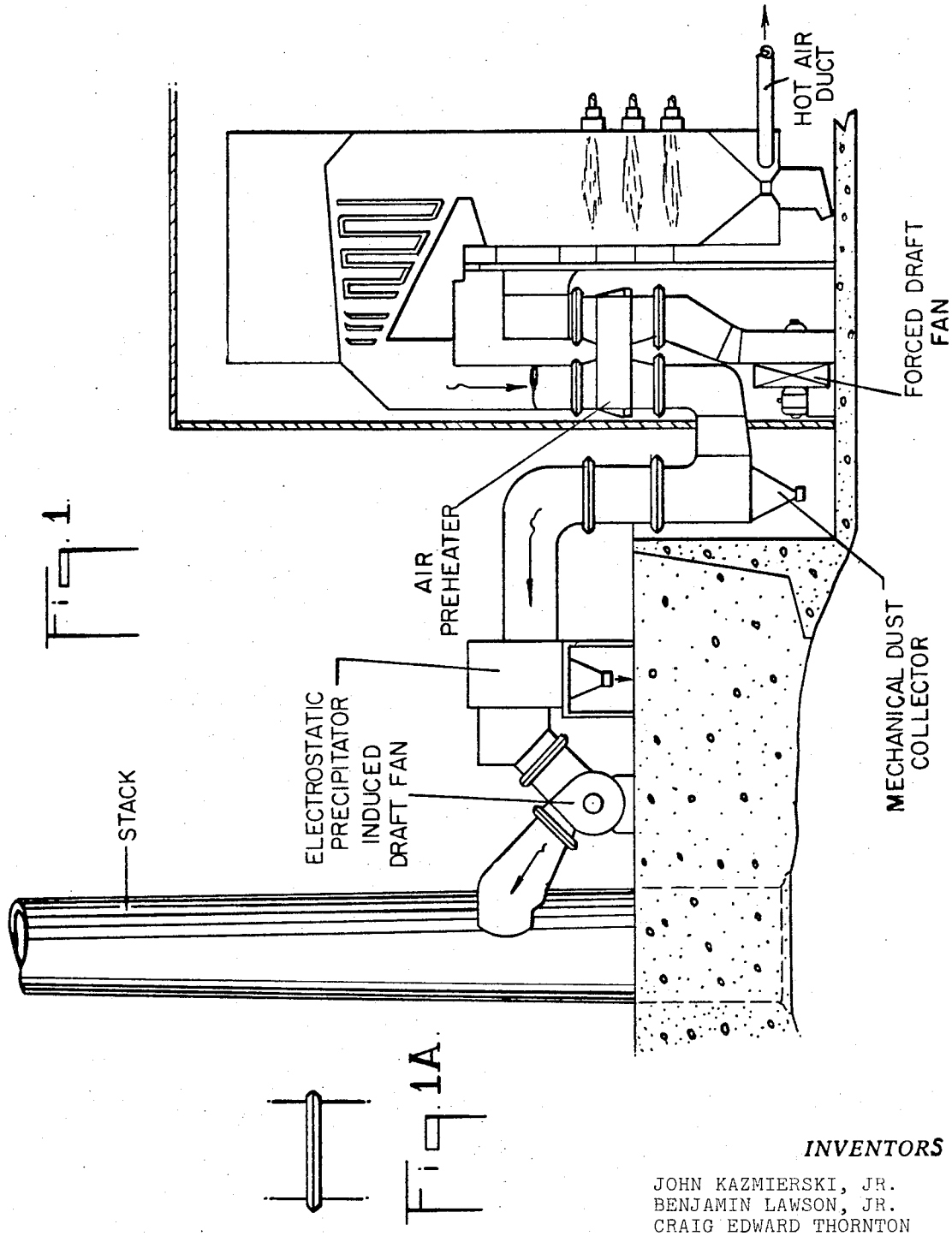
FIG. 1 represents a power plant combustion system showing ducts for handling hot exhaust gases and the use of duct connectors therewith.
FIG. 1A is a legend for indicating expansion joints in FIG. 1.

There is illustrated in FIG. 1 a general arrangement of a portion of a power plant and showing particularly the ducting for carrying hot gases through various components thereof to a stack. FIG. 1A is a legend for indicating duct connectors which appear at several locations in FIG. 1. The purpose of the connectors or expansion joints is for connecting ends of adjacent ducts or apparatus in a manner for permitting or accommodating misalignment and/or thermal expansion or contraction therebetween.

It will be apparent from an inspection of the ducting in FIG. 1 that connectors are necessary at numerous locations to accommodate misalignment and/or absorb expansion and contraction between adjacent ducts. Induced movement is often compounded, for example, in laterally disposed ducts. Thus, in FIG. 2 it can be seen that movement occurs in several directions as indicated by arrows A, B, C and D. Movement in duct 10, for example, according to arrow A causes lateral displacement of itself with respect to leg 12 of stack 14. This relative displacement must be absorbed by the connector or joint therebetween. Also, linear expansion of leg 12 causes an angular movement indicated by arrow C. Torsional deflection is indicated by arrow D. All these movements and forces are present in a ducting system.

FIGS. 3A through 3E illustrates generally aligned ducts connected by a joint wherein some relative displacement is indicated. FIG. 3A represents movement of the duct sections in opposite directions. FIG. 3B represents relative movement of the duct sections toward each other. FIG. 3C represents lateral displacement between adjacent duct sections. FIG. 3D represents relative angular displacement between ducts. FIG. 3E represents torsional deflection of relatively aligned ducts. The present invention is adapted for accommodating all these movements.

FIGS. 4 and 5 represent, respectively, frontal and perspective views of an expansion joint according to the present invention. It is designated generally by the numeral 25. A pair of open rectangular frames 26, 28 are located at opposite axial ends thereof for connection with duct openings. These frames, which may be fabricated from angle shape, include inturned flanges carrying a plurality of spaced apart studs 27 adapted for connection with duct openings. Frames 26 and 28 are connected by a flexible sleeve 40 on the outside which is lined or protected by shield means on the inside.

Figure 6:
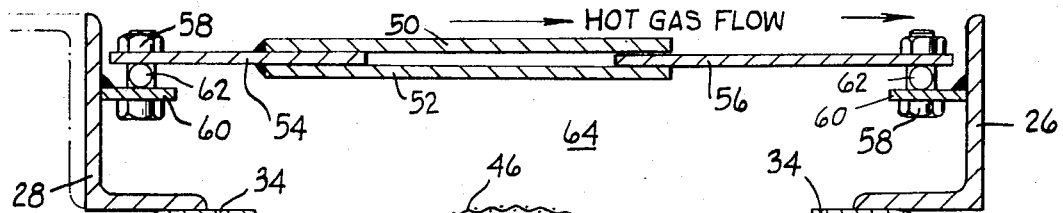
FIG. 6 is a cross-sectional view (enlarged) taken along lines 6—6 of FIG. 4.
Figure 7:
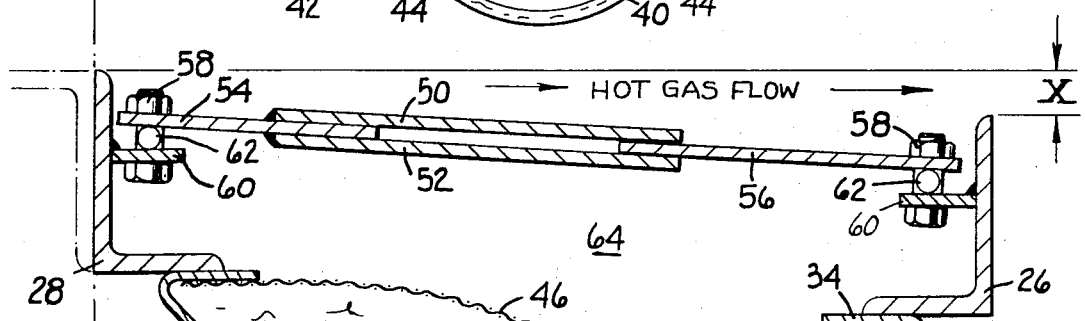
FIG. 7 is a cross-sectional view similar to that of FIG. 6 but showing lateral displacement of the frame members.
Figure 8:
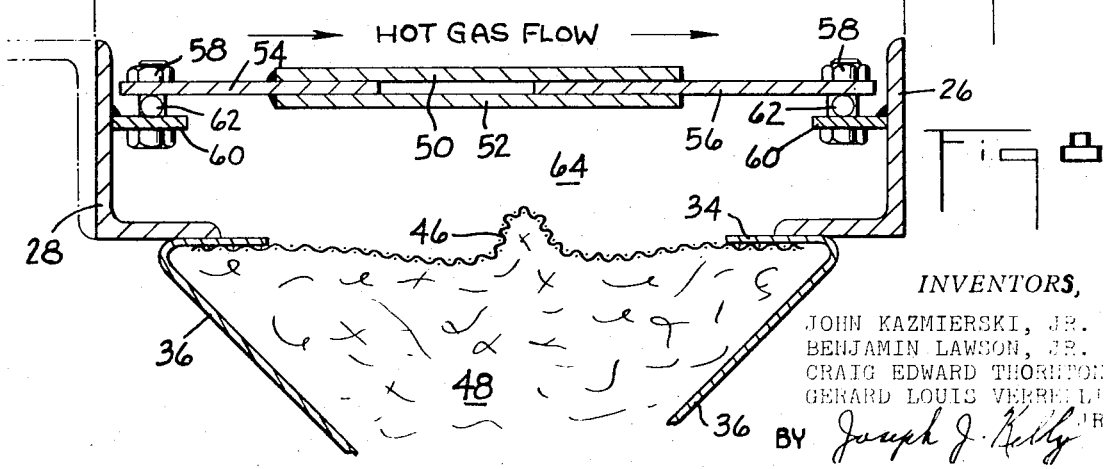
FIG. 8 is a cross-sectional view similar to that of FIG. 6 but showing the frame members compressed toward one another.

FIGS. 6 through 8 which are cross-sectional views taken through a sidewall of the expansion joint typically line 6—6 of FIG. 4. Spaced apart rectangular frames 26 and 28 are adapted to be bolted or otherwise connected between mating flanges on the ends of adjacent duct sections. A Z-shaped rectangular frame, which surrounds each frame 26, 28, is welded or otherwise connected thereto along its base 34 to provide a substantial seal. Upstanding body portions 36 terminate in an outwardly facing seat portion 38. A flexible heat resistant sleeve 40 has opposite ends residing in seat 38 and is retained in sealing contact therewith by means of bolts 42 and bars 44. A sleeve 46 of flexible woven wire mesh or the like surrounds frames 26 and 28 and is secured to base portions 34 of the Z-frames for the purpose of defining a space 48. This space is filled with a resilient insulation such as glass fibers to restrict heat transmission to the outside of the connector, particularly to sleeve 40.

The frames 26, 28 and body portions 36 may be formed of steel, preferably stainless steel where high temperature gases are handled.

A plurality of plates span the distance between spaced apart frames 26 and 28 to provide a shield for protecting sleeve 40 and glass fibers 48 from solid-laden hot corrosive gases. Certain plates are rockably connected to the frame in sealed relationship therewith. The plates are arranged to telescope relative to each other for accommodating relative movement of the frames, yet retain their sealing action. The connector disclosed herein is rectangular with the plates spanning the sides thereof. The plate shield on one side of the connector only will be discussed since the other sides are substantially identical. A pair of steel plates 50, 52 are welded or otherwise secured along one side to another plate 54 in the manner clearly indicated in the drawings. The opposite side of plates 50, 52 are spaced apart and telescopically receive still another plate 56 edgewise therein. The total width of the several plates may telescopically vary over a wide range. A tight sliding fit exists at the telescoping joint for establishing a seal. The opposite sides of plates 54 and 56 are rockably connected to respective frames 28 and 26.

This rockable connection is defined by plural bolts 58 which clamp elongate rods 62 tightly between plates 54 and 56 and plate portions 60 of respective frames 28 and 26. A limited amount of rocking motion is permitted about these rods to permit the plates defining the shield to be tilted in a manner to accommodate lateral displacement of the frames as indicated by dimension X in FIG. 7 or a greater displacement if required. A tight connection by bolts 58 in slightly oversize holes provide for ample rockable displacement of the plate shields relative to the rectangular frames. The shield is adapted to telescope in a lateral direction and rock about its connection to frames 26, 28. These motions are illustrated by the arrows in FIG. 12. As illustrated in FIGS. 13 and 14, plate 56 is also adapted to slide longitudinally as well as angularly.

Plates 50, 52, 54 and 56 are normally formed of steel, preferably stainless steel for high temperature service.

Opposite ends of each plate 54, 56 are provided with longitudinal slots 66. It will be noted in FIGS. 9 and 11 that similar slots are applied to adjacent plates which are to be joined at a corner. Corner angle member 70 is provided with plural longitudinal slots 68. This angle member is adapted to fit in the corner of the juncture between two pieces of shielding as shown in FIGS. 9, 10 and 11. Bolts 72 extend through these slots to establish a connection. Since slots 66 and 68 are transversely disposed, it will be evident that considerable relative movement is permitted between the adjacent plates at the corner.

The shielding normally comprises four straight sections to match the sides of the connector. As frames 26, 28 move, the shield plates follow. Tilting motion of the plates along one side requires sliding motion on a set of plates located at 90° therefrom, and vice versa. It is the combination of tilting and sliding motion which accommodates movement of the frames in three directions.

Hot gases, in flowing through the connector, pass across the plates in the direction indicated by the arrows in FIGS. 6–8. Since the plates are arranged in a manner to substantially seal the space between end frames 26, 28, fly ash carried with the gases is prevented, or at least substantially restricted, from entry into the insulation and from coming into contact with flexible member 40. Heat transfer from the plates to other elements of the joint is substantially reduced by reason of space 64. It is important to prevent entry and accumulation of fly ash in the sleeve since it is abrasive and corrosive in the presence of water.

Corner member 70 rests on plates 50, which are located above plates 54 and 56 by the thickness of plates 50. In order to seal this space and prevent leakage of hot gases and fly ash therethrough, a resilient gasket 57 of heat resistant material is placed therein. See FIGS. 9 and 11. The gasket seals, the space between plates 54, 56 and corner angle member 70 yet permits relative movement therebetween.

We have illustrated one form of our invention with detailed descriptions thereto. It is obvious, however, that various modifications may be made therein without departing from the spirit of this invention. We wish to have the breadth of this invention defined by the claims which follow.

We claim:

1. A duct connector for connecting and accommodating misalignment, expansion and contraction of adjacent generally aligned ducts comprising:
   first and second open rectangular frames axially spaced apart from each other,
   means flexibly connecting the frames defining a sleeve therebetween,
   said frames adapted to be connected to respective duct ends,
   on the four sides of said frames, plural plates having portions in telescoping close sliding contact with one another to define a shield for use against hot corrosive gases,
   corner means securing the sides of adjacent plates together and permitting limited movement between adjacent plates, said telescoping close sliding contact comprising portions of one plate sliding between portions of two other plates, each of said plates connected to one of the sides of respective frames and spanning the spaced apart distance therebetween internally of the sleeve, portions of said plates connected to the sides of said frames in sealed rockable relationship therewith by a connection comprising an elongate rod retained between said plate portion and said frame side and permitting relative rockable motion therebetween, said close sliding contact between plates and the sealed rockable relationship with the frames thereby defining a shield capable of accommodating relative movement between the first and second frame and conducting hot corrosive gases therethrough.

2. The invention according to claim 1 wherein the plural plates are disposed in a generally planar relationship during their relative sliding movement as they accommodate relative movement between the first and second frames.

3. The invention according to claim 1 wherein lateral displacement between the frames causes the plates on two sides to rock with respect to the frame and causes the plates on the other two sides to slide with respect to each other.

4. A duct connector for connecting and accommodating misalignment, expansion and contraction of adjacent generally aligned ducts comprising:

first and second open rectangular frames axially spaced apart from each other, means flexibly connecting the frames defining a sleeve therebetween, said frames adapted to be connected to respective duct ends, a plurality of plates having portions in sliding engagement with each other defining a movable shield against hot corrosive gases extending between the spaced apart first and second frames and internally of the sleeve, means to rockably connect the plates to the frames, said rockable means defining a sealed relationship between the portions and frames, corner means securing the sides of adjacent plates together and permitting limited movement between adjacent plates, said sliding engagement between plates and the sealed rockable relationship with the frames thereby defining a shield capable of accommodating relative movement between the first and second frames and conducting hot corrosive gases therethrough.

5. The invention according to claim 4 wherein the sliding engagement comprises one plate sliding between two other plates.

6. The invention according to claim 4 wherein the rockable means comprises an elongate rod disposed between the plate portion and frame.

* * * * *

Disclaimer 3,730,566.—*John Kazmierski, Jr.*, Ringoes, *Benjamin Lawson, Jr.*, Somerset, *Craig Edward Thornton*, Flemington, and *Gerard Louis Verrelli, Jr.*, Manville, N.J. DUCT CONNECTOR. Patent dated May 1, 1973. Disclaimer filed Feb. 24, 1978, by the assignee, *Johns-Manville Corporation*.

Hereby enters this disclaimer to all claims of said patent.

[*Official Gazette April 25, 1978.*]